United States Patent
Fushiki

(10) Patent No.: US 8,695,758 B2
(45) Date of Patent: Apr. 15, 2014

(54) SOUNDPROOF SHEET FOR VEHICLES, MANUFACTURING METHOD THEREOF, AND DASH SILENCER FOR VEHICLES USING SOUNDPROOF SHEET

(75) Inventor: Shinobu Fushiki, Kasugai (JP)

(73) Assignee: Howa Textile Industry Co., Ltd., Kasugai-Shi (JP)

( * ) Notice: Subject to any disclaimer, the term of this patent is extended or adjusted under 35 U.S.C. 154(b) by 0 days.

(21) Appl. No.: 13/808,019

(22) PCT Filed: Jul. 24, 2012

(86) PCT No.: PCT/JP2012/068642
§ 371 (c)(1),
(2), (4) Date: Jan. 2, 2013

(87) PCT Pub. No.: WO2013/051320
PCT Pub. Date: Apr. 11, 2013

(65) Prior Publication Data
US 2013/0153330 A1   Jun. 20, 2013

(30) Foreign Application Priority Data

Oct. 6, 2011 (JP) ................... 2011-221778

(51) Int. Cl.
*E04B 1/82* (2006.01)
(52) U.S. Cl.
USPC .......... 181/290; 181/284; 296/39.1; 296/39.3
(58) Field of Classification Search
USPC ................... 181/290; 296/39.1, 39.3
See application file for complete search history.

(56) References Cited

U.S. PATENT DOCUMENTS

| | | | | |
|---|---|---|---|---|
| 4,117,641 A * | 10/1978 | Wells | ............ | 52/404.3 |
| 5,941,590 A * | 8/1999 | Reynolds et al. | ............ | 296/39.1 |
| 6,772,857 B2 * | 8/2004 | Porte et al. | ............ | 181/210 |
| 7,431,128 B2 * | 10/2008 | Choi | ............ | 181/296 |
| 7,503,429 B2 * | 3/2009 | Boyce | ............ | 181/290 |
| 7,810,598 B2 * | 10/2010 | Nonogaki | ............ | 180/69.22 |
| 7,823,693 B2 * | 11/2010 | Boyce | ............ | 181/284 |
| 2004/0066054 A1 * | 4/2004 | Bohm et al. | ............ | 296/39.1 |
| 2005/0046218 A1 * | 3/2005 | Campbell | ............ | 296/39.3 |
| 2011/0221223 A1 * | 9/2011 | Mizata | ............ | 296/39.3 |

FOREIGN PATENT DOCUMENTS

| | | |
|---|---|---|
| JP | U-3-96245 | 10/1991 |
| JP | A-2009-12561 | 1/2009 |
| JP | A-2009-18746 | 1/2009 |
| JP | A-2010-76601 | 4/2010 |

OTHER PUBLICATIONS

International Search Report issued in International Patent Application No. PCT/JP2012/068642 dated Oct. 16, 2012 (w/translation).

* cited by examiner

*Primary Examiner* — Forrest M Phillips
(74) *Attorney, Agent, or Firm* — Oliff PLC

(57) ABSTRACT

A dash silencer is constructed by layering a front side layer formed from a porous material, an intermediate layer constructed by a film structure body and a rear side layer. The rear side layer has upper and lower side layer portions which are formed from porous and sound insulation materials respectively and layered on upper and lower side layer portions of the intermediate layer.

18 Claims, 7 Drawing Sheets

SOUNDPROOF SHEET FOR VEHICLES, MANUFACTURING METHOD THEREOF, AND DASH SILENCER FOR VEHICLES USING SOUNDPROOF SHEET

BACKGROUND OF THE INVENTION

1. Field of the Invention

The present invention relates to a soundproof sheet for vehicles, a manufacturing method thereof, and a dash silencer for vehicles using the soundproof sheet.

2. Description of the Related Art

Conventionally, in this type of a soundproof sheet for a vehicle, for example, a dash insulator for a vehicle disclosed in Japanese Patent Application Laid-Open No. 2009-12561 was proposed. The dash insulator is constructed with a sound absorbing material installed in a dash panel at an inner side of a vehicle compartment thereof and with a sound insulation member installed on the sound absorbing material at an instrument-panel lower side thereof.

In the dash insulator having the above-described construction, the sound absorbing material absorbs mainly noises of a high frequency range in noises from an engine room. The sound insulation material insulates mainly noises of a low frequency range in noises of the engine room under its lamination structure with the sound absorbing material.

Accordingly, the dash insulator functions so as to perform soundproofing of noises in the engine room from the interior of the vehicle compartment over high to low frequency ranges of the noises in the engine room. Thus, noises which cannot be absorbed or insulated by the dash insulator is transmitted into the interior of the vehicle compartment.

By the way, according to the dash insulator as constructed above, when the noise is transmitted from the above-described dash insulator to the inner side of the vehicle compartment, the noises are transmitted from a portion of the sound absorbing material corresponding to the instrument panel to the inner portion of the instrument panel and is transmitted to the interior of the vehicle compartment from a portion of the sound absorbing material corresponding to the lower side of the instrument panel and the sound insulation material.

Herein, as described above, the portion of the dash insulator opposing the inner portion of the instrument panel is not the sound insulation material but a portion of the sound absorbing material opposing the instrument panel.

Therefore, if the noises transmitted to the inner portion of the instrument panel as described above are reflected by the instrument panel and is absorbed by the opposing portion of the sound absorbing material, phenomenon that the reflected noises are confined within the instrument panel are reduced.

However, the sound absorbing material is merely a single layer. Therefore, it is difficult to effectively absorb noises from the engine room by the sound absorbing material. This means that the sound absorption performance of the dash insulator to noises from the engine room is insufficient.

In other words, in the dash insulator, even if the above-described sound insulation material is installed so as not to oppose the inner portion of the instrument panel, as described above, the sound absorption performance of the sound absorbing material to the reflected noises in the above-described instrument panel is insufficient, and the sound insulation performance of the sound insulation material is also insufficient under lamination structure of the sound insulation material with the sound absorbing material.

On the contrary, like a laminated sound absorbing layer in a soundproofing material for a vehicle disclosed in Japanese Patent Application Laid-Open No. 2009-18746, it may be considered to construct the above-mentioned sound absorbing material by a lamination structure of a base sound absorbing layer and a foamed resin sheet which have different surface densities to each other.

However, in such a simple lamination structure, the sound absorption performance or the sound insulation performance, as described above is still insufficient.

SUMMARY OF THE INVENTION

It is therefore an object of the present invention to provide a soundproof sheet for a vehicle capable of sufficiently securing sound absorption and insulation performances to noises by contriving a lamination construction necessary for exerting sound absorption performance and sound insulation performance.

It is another object of the present invention to provide a manufacturing method of the soundproof sheet for a vehicle.

It is still another object of the present invention to provide a dash silencer for a vehicle using the soundproof sheet.

In order to solve these objects according to the present invention, there is provided a soundproof sheet for a vehicle which includes:

a first outer layer formed from a porous material and including a one-side outer layer portion and the other-side outer layer portion being extended from the one-side outer layer portion;

an intermediate layer formed by a film lamination body to be layered on the one-side outer layer portion of the first outer layer; and a second outer layer including a one-side outer layer portion formed from a porous material to be layered on at least the one-side outer layer portion of the first outer layer through the intermediate layer and including the other-side outer layer portion formed from a sound insulation material to be layered on the other-side outer layer portion of the first outer layer.

Accordingly, when noises are incident on the first outer layer, the noises are absorbed by the first outer layer since the first outer layer is formed from a porous material. Thereafter, the noises are incident on the intermediate layer and the other-side outer layer portion of the second outer layer.

Herein, the film lamination body or the intermediate layer is formed by laminating a plurality of films. Thus, the noises incident on the intermediate layer is effectively absorbed by the film lamination body, and thereafter, the noises are incident on the second outer layer.

Incidentally, the second outer layer is, as described above, constructed by a one-side outer layer portion and the other-side outer layer portion. Herein, in the second outer layer, the one-side outer layer portion is formed from a porous material, and the other-side outer layer portion is formed from a sound insulation material.

Therefore, the noises which are incident on the intermediate layer and pass through the intermediate layer are absorbed by the one-side outer layer portion of the second outer layer, and the noises which are incident on the other-side outer layer portion of the second outer layer is insulated by the other-side outer layer portion of the second outer layer.

In this manner, by contriving the lamination structure capable of obtaining the sound absorption and insulation performances of the soundproof sheet, the noises can be effectively soundproofed by the soundproof sheet.

According to an aspect of the present invention, in the above-described soundproof sheet, the intermediate layer is layered on both of the one-side and other-side outer layer portions of the first outer layer, and the second outer layer is layered at its other-side outer layer portion on a layer portion of the intermediate layer corresponding to the other-side outer layer portion of the first outer layer.

In this manner, the intermediate layer is layered on both of the one-side and other-side outer layer portions of the first outer layer, and the second outer layer is layered at its other-side outer layer portion on a layer portion of the intermediate layer corresponding to the other-side outer layer portion of the first outer layer.

Thus, in the other-side outer layer portion of the second outer layer, after the noises are absorbed by the layer portion of the intermediate layer corresponding to the other-side outer layer portion of the first outer layer, the noises are insulated by the other-side outer layer portion of the second outer layer. Accordingly, the functions and effects of the present invention can be further improved.

According to another aspect of the present invention, in the above-described soundproof sheet, the one-side and other-side outer layer portions of the second outer layer are layered at their mutual neighboring portions on a portion of the intermediate layer corresponding to the mutual neighboring portions of the intermediate layer to be superposed with each other. Thus, the functions and effects of the present invention can be further improved.

According to still another aspect of the present invention, in the above-described soundproof sheet, the film lamination body constructing the intermediate layer includes:

a barrier film formed from a resin having a melting point higher than that of a thermoplastic resin;

a first film formed from the thermoplastic resin and fusion-bonded at a temperature lower than the melting point to be layered on the barrier film; and a second film formed from the thermoplastic resin and fusion-bonded at a temperature lower than the melting point to be layered on the barrier film so as to oppose the first film through the barrier film, and wherein the one-side outer layer portion of the second outer layer is superposed at the neighboring portion thereof on the neighboring portion of the other outer layer portion of the second outer layer so as to oppose the corresponding portion of the intermediate layer through the neighboring portion of the other outer layer portion of the second outer layer.

In this manner, the intermediate layer is constructed as a three-layered film lamination body including a first film, a barrier film and a second film. Thus, the sound absorption performance of the intermediate layer to the noises can be further improved.

Accordingly, even though the one-side outer layer portion of the second outer layer is superposed at the neighboring portion thereof to the neighboring portion of the other-side outer layer portion of the second outer layer so as to oppose the corresponding portion of the intermediate layer through the neighboring portion of the other-side outer layer portion of the second outer layer, the functions and effects of the present invention can be further improved.

According to still another aspect of the present invention, in the above-described soundproof sheet, the film lamination body has a plurality of small holes which are formed dispersedly and penetratingly through the film lamination body toward each thickness direction of the first film, the barrier film and the second film.

In this manner, a plurality of the small holes are formed in the film lamination body. Thus, the sound absorption performance of the intermediate layer to the noises from the first outer layer can be further improved.

According to a further aspect of the present invention, there is provided a manufacturing method of a soundproof sheet for a vehicle, comprising:

a preparatory process for preparing a porous material layer for a first outer layer, preparing a porous material layer for a one-side outer layer portion of a second outer layer and a sound insulation material layer for the other-side outer layer portion of the second outer layer, and preparing a thermoplastic resin material film for a one-side film, a resin material film for a barrier film having a melting point higher than that of the thermoplastic resin material film, and a thermoplastic resin material film for the other-side film;

a heating process for layering the thermoplastic resin material film for the one-side film, the resin material film for the barrier film and the thermoplastic resin material film for the other-side film, and heating and fusion-bonding them with each other at a temperature which is higher than a melting point of the thermoplastic resin material film and lower than the melting point of the resin material film for the barrier film; and a vacuum molding process for layering the porous material layer for the first outer layer on the film lamination body, layering the porous material layer for the one-side outer layer portion of the second outer layer and the sound insulation material layer for the other-side outer layer portion of the second outer layer respectively on one-side and other-side portions of the porous material layer for the first outer layer through the film lamination body, and pressing and cooling them integrally under vacuum molding so as to be adhered to each other.

By manufacturing the soundproof sheet in this manner, it is possible to provide the soundproof sheet capable of obtaining the above-described functions and effects of the present invention.

Herein, the porous material layer for the first outer layer, the film lamination body, and the porous material layer for the one-side outer layer portion and the sound insulation material layer for the other-side outer layer portion are layered to each other, as described above, and pressed and cooled integrally so as to be adhered to each other. Thus, integral molding of the soundproof sheet can be performed by one-shot molding. As a result, the manufacturing processes of the soundproof sheet can be further simplified.

According to a still further aspect of the present invention, at the vacuum molding process, for layering the porous material layer for the first outer layer, the thermoplastic resin material film for the one-side film, the resin material film for the barrier film, the thermoplastic resin material film for the other-side film, the porous material layer for the one-side outer layer portion of the second outer layer and the sound insulation material layer for the other-side outer layer portion of the second outer layer, the one-side and other-side outer layer portions of the second outer layer are superposed at their mutual opposing end portions to each other and layered on a portion of the thermoplastic resin material film for the other-side film opposing the mutual opposing end portions of the one-side and other-side outer layer portions of the second outer layer. Thus, it is possible to provide the soundproof sheet capable of obtaining the functions and effects of the present invention.

According to a still further aspect of the present invention, there is provided a dash silencer for a vehicle which is installed along a partitionary wall member partitioning an engine room and a vehicle compartment included in the vehicle with an instrument panel disposed oppositely to an upper side portion of the partitionary wall member from the inner side of the vehicle compartment, the dash silencer comprising:

a soundproof sheet which includes;

a first outer layer formed from a porous material and having a one-side outer layer portion and the other-side outer layer portion being extended from the one-side outer layer portion, an intermediate layer formed by a film lamination body to be layered on the one-side outer layer portion of the first outer layer, and a second outer layer having one-side and other-side outer layer portions, the one-side layer portion of the second outer layer being formed from a porous material to be layered on at least the one-side layer portion of the first outer layer through the intermediate layer, the other-side outer layer portion of the second outer layer being formed from a sound insulation material to be layered on the other-side outer layer portion of the first outer layer, wherein the soundproof sheet is mounted on at least a predetermined region of the partitionary wall member to oppose the instrument panel at the one-side layer portion of the second outer layer and to extend the first outer layer along the partitionary wall member from its up-side to its lower-side.

Accordingly, it is possible to provide the dash silencer capable of obtaining the functions and effects of the present invention.

Herein, in the soundproof sheet, the intermediate layer may be layered on both of the one-side and other-side outer layer portions of the first outer layer, and the second outer layer may be layered at its other-side outer layer portion on a layer portion of the intermediate layer corresponding to the other-side outer layer portion of the first outer layer.

In addition, the one-side and other-side outer layer portions of the second outer layer may be layered at their mutual neighboring portions on a portion of the intermediate layer corresponding to the mutual neighboring portions of the intermediate layer to be superposed with each other.

And, the film lamination body has a plurality of small holes which are formed dispersedly and penetratingly through the film lamination body toward each thickness direction of the first film, the barrier film and the second film.

BRIEF DESCRIPTION OF THE DRAWINGS

Other features and advantages of the invention will be apparent from the following description taken in connection with the accompanying drawings, wherein.

DETAILED DESCRIPTION OF THE PREFERRED EMBODIMENTS

Figure 1:
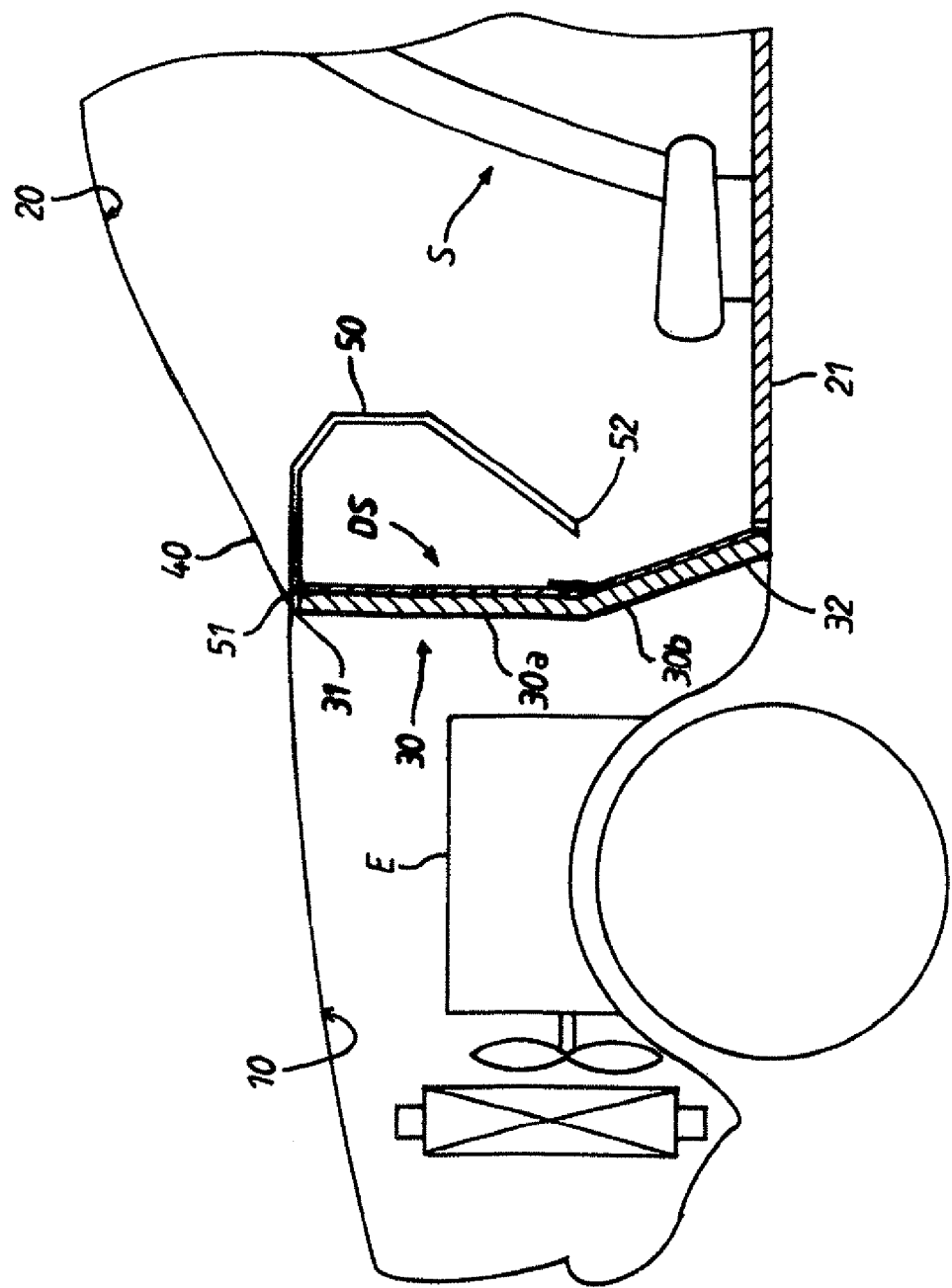
FIG. 1 is a schematic partial cross-sectional diagram illustrating a vehicle using a dash silencer according to a first embodiment of the present invention.

FIG. 1 illustrates a first embodiment of the present invention which is applied to a vehicle. The vehicle includes an engine room 10 and a vehicle compartment 20. In the vehicle, the vehicle compartment 20 is installed following the engine room 10. In addition, an engine E is disposed within the engine room 10. A front side seat S is disposed within the vehicle compartment 20.

The vehicle includes a dashboard 30 (also, referred to as a dash panel 30). The dashboard 30 is installed at the boundary between the engine room 10 and the vehicle compartment 20 to partition the engine room 10 and the vehicle compartment 20 with each other.

Herein, the dashboard 30 is formed in the form of a "<" shape which is convex toward the front side as illustrated in a longitudinal cross-sectional shape of FIG. 1. Thus, the dashboard 30 constructs integrally an upper side board portion 30a and a lower side board portion 30b.

The dashboard 30 is coupled with a boundary portion between a lower end portion of a front wind shield 40 and a rear end portion of an upper wall of the engine room 10 at an upper end portion 31 of the upper side board portion 30a. The lower side board portion 30b of the dashboard 30 is integrally extended downward from the lower end portion of the upper side board portion 30a, and the lower side board portion 30b is coupled with a front end portion of an upper wall 21 of the vehicle compartment 20 at the lower end portion 32.

The vehicle also includes an instrument panel 50. The instrument panel 50 is, as illustrated in FIG. 1, coupled at its upper end portion 51 with the boundary portion between the lower end portion of the front wind shield 40 and the rear end portion of the upper wall of the engine room 10.

And, the instrument panel 50 is formed to be extended from the upper end portion 51 in an inclined shape toward the lower front side in the form of a curved sectional shape which is convex backward.

Herein, the extended lower end portion 52 of the instrument panel 50 opposes the boundary portion between the upper side board portion 30a and the lower side board portion 30b of the dashboard 30 from the rear side.

Furthermore, the vehicle includes a dash silencer DS. The dash silencer DS is, as shown in FIG. 1, assembled along the dashboard 30 from side of the vehicle compartment 20. The dash silencer DS is, as illustrated in FIG. 2, formed in the same longitudinal sectional shape as the longitudinal sectional shape of the dashboard 30 and is laminated or layered on the dashboard 30 from the inner portion of the vehicle compartment 20.

Figure 2:
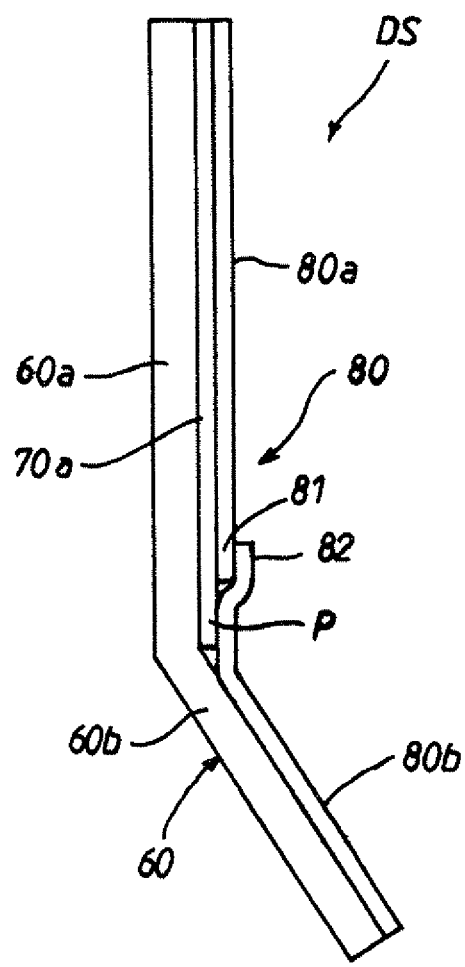
FIG. 2 is an enlarged side diagram of the dash silencer illustrated in FIG. 1.
Figure 3:
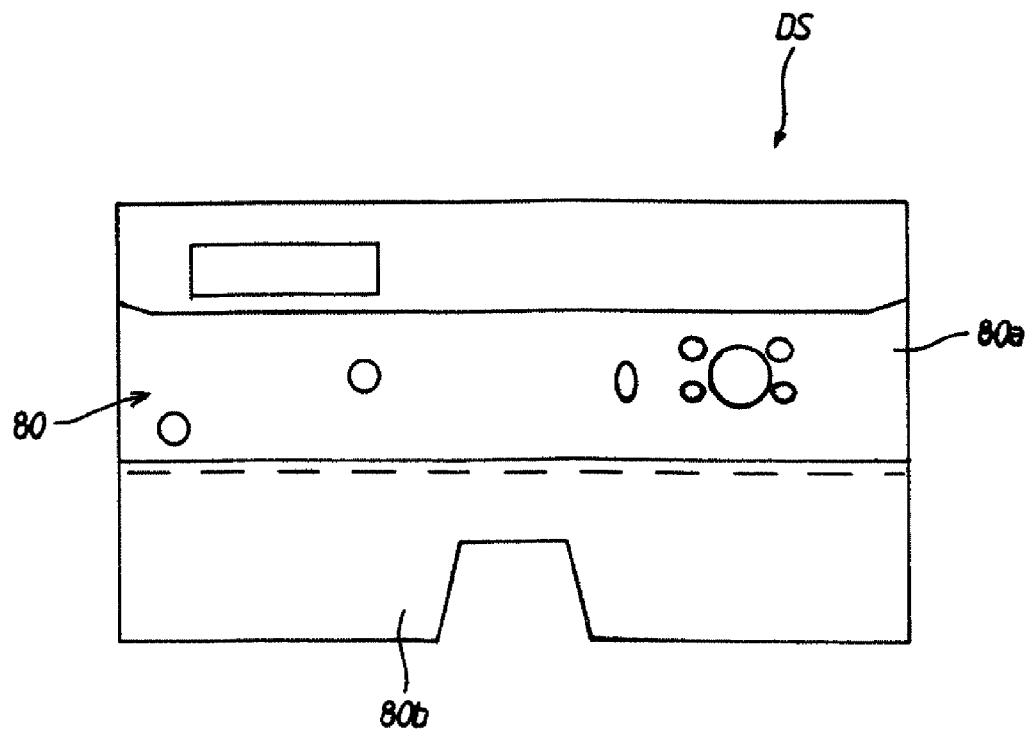
FIG. 3 is an enlarged rear diagram of the dash silencer illustrated in FIG. 1.

As illustrated in FIG. 2 or 3, the dash silencer DS includes a front side layer 60, an intermediate layer 70 and a rear side layer 80. The front side layer 60, the intermediate layer 70 and the rear side layer 80 are layered from the front side to the rear side of the vehicle sequentially.

The front side layer 60 is, as illustrated in FIG. 2, formed in the same longitudinal sectional shape as that of the dashboard 30. The front side layer 60 is constructed by an upper side layer portion 60a and a lower side layer portion 60b which are formed respectively along the upper side board portion 30a and the lower side board portion 30b of the dashboard 30. Then, the front side layer 60 is assembled on the upper side board portion 30a and the lower side board portion 30b of the dashboard 30 along the rear surface sides thereof at the upper side layer portion 60a and the lower side layer portion 60b.

Herein, the front side layer 60 is formed from a porous material so as to have a predetermined thickness (for example, 8 (mm)) and a predetermined basis weight (for example, 300 (g/m$^2$)). Thus, the front side layer 60 acts as sound absorbing layer which mainly absorbs high frequency noise components of noises (hereinafter, referred to as engine noises) from the engine E.

In addition, the engine noises include high frequency components (hereinafter, referred to as high frequency noise components) and low frequency components (hereinafter, referred to as low frequency noise components).

In the first embodiment, as a porous material forming the front side layer 60, adopted is a felt (hereinafter, referred to as a felt for the front side layer) formed from, for example, polyethylene terephthalate (hereinafter, referred to as PET). Additionally, the boundary portion between the upper side layer portion 60a and the lower side layer portion 60b of the front side layer 60 corresponds to the boundary portion between the upper side board portion 30a and the lower side board portion 30b of the dashboard 30.

The intermediate layer 70 is, as illustrated in FIG. 2, formed in the same longitudinal sectional shape as that of the front side layer 60. The intermediate layer 70 is constructed by an upper side layer portion 70a and a lower side layer portion 70b which are formed respectively along the upper side layer portion 60a and the lower side layer portion 60b of the front side layer 60. Thus, the intermediate layer 70 is layered at the upper side layer portion 70a and the lower side layer portion 70b respectively on the upper side layer portion 60a and the lower side layer portion 60b of the front side layer 60 along the rear surface sides thereof.

Figure 4:
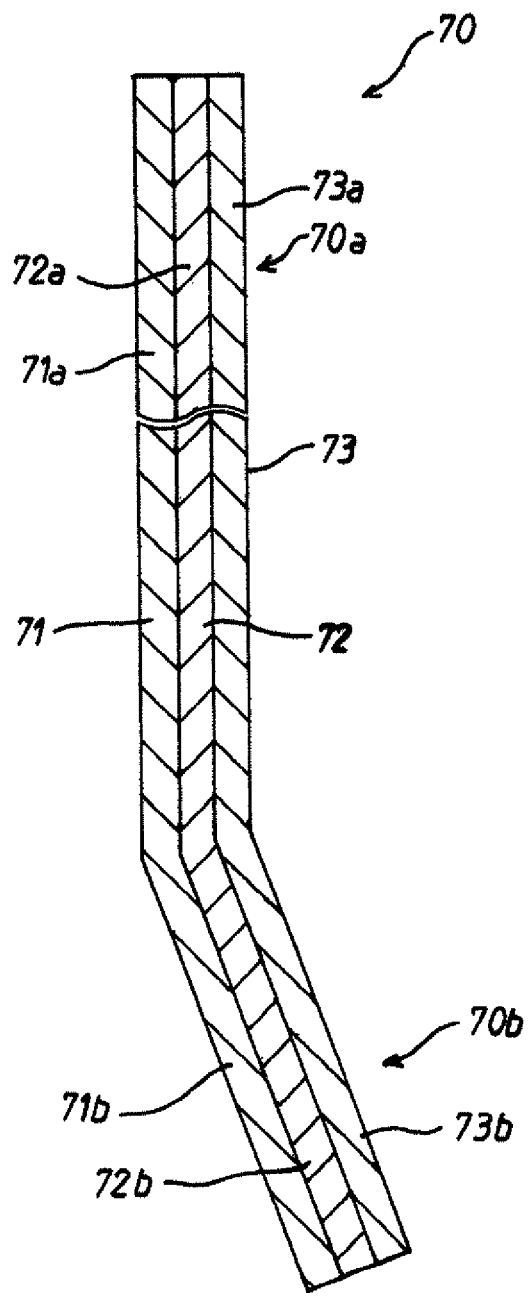
FIG. 4 is an enlarged partial fragmented longitudinal cross-sectional diagram of a film lamination body illustrated in FIG. 1.

Furthermore, the intermediate layer 70 is constructed by a non-air permeable film lamination body. The film lamination body or the intermediate layer 70 is, as illustrated in FIG. 4, formed by layering a front side film 71, a barrier film 72 and a rear side film 73.

The front side film 71 is layered at its front surface on the rear surface of the front side layer 60. The barrier film 72 is fusion-bonded and layered at its front surface on the rear surface of the front side film 71. The rear side film 73 is fusion-bonded and layered on the rear surface of the barrier film 72.

The front side film 71 is formed from a predetermined thermoplastic material for the front side film with a predetermined thickness. This front side film 71 is fusion-bonded at its front surface on the rear surface of the front side layer 60.

Herein, the front side film 71 is constructed by an upper side film portion 71a and a lower side film portion 71b which are formed respectively along the upper side layer portion 60a and the lower side layer portion 60b of the front side layer 60. Each front surface of The upper side film portion 71a and the lower side film portion 71b of the front side film 71 are fusion-bonded at their front surfaces respectively on the rear surfaces of the upper side layer portion 60a and lower side layer portion 60b of the front side layer 60.

In the first embodiment, a predetermined thickness of the above-described front side film 71 is predetermined to be 20 (μm). In addition, polyethylene is adopted as the above-described predetermined thermoplastic material for the front side film.

The barrier film 72 is formed from a predetermined thermoplastic material for the barrier film with a predetermined thickness in the form of a film shape. Thus, the barrier film 72 is fusion-bonded at its front surface on the rear surface of the front side film 71.

Herein, the barrier film 72 is constructed by an upper side film portion 72a and a lower side film portion 72b which are formed respectively along the upper side film portion 71a and lower side film portion 71b of the front side film 71. The upper side film portion 72a and lower side film portion 72b of the barrier film 72 are fusion-bonded at their front surfaces on the rear surfaces of the upper side film portion 71a and lower side film portion 71b of the front side film 71.

In the first embodiment, a predetermined thickness of the above-described barrier film 72 is predetermined to be 15 (μm). In addition, nylon is employed as the above-described predetermined thermoplastic material for the barrier film.

In the first embodiment, the reason why nylon is adopted as the above-described predetermined thermoplastic material, as described above, is based on the fact that nylon has a melting point higher than that of polyethylene which is a forming material of the front side film 71 as described above.

The rear side film 73 is formed from a predetermined thermoplastic material for the rear side film in the form of a film shape. The rear side film 73 is fusion-bonded at its front surface on the rear surface of the barrier film 72.

Herein, the rear side film 73 is constructed by an upper side film portion 73a and a lower side film portion 73b respectively along the upper side film portion 72a and lower side film portion 72b of the barrier film 72. The upper side film portion 73a and lower side film portion 73b of the rear side film 73 are fusion-bonded at their front surfaces respectively on the rear surfaces of the upper side film portion 72a and lower side film portion 72b of the barrier film 72.

In the first embodiment, as the above-described predetermined thermoplastic material for the rear side film, polyethylene is adopted similarly to the front side film 71. Additionally, the above-described fusion-bonding of the barrier film 72 to the front side film 71 and rear side film 73 is performed at a temperature lower than the melting point of nylon.

The intermediate layer 70 constructed as described above produces resonance phenomena to the above-mentioned engine noises on a basis of non-air permeable characteristics of the film lamination body and thinness of the film lamination body, thereby to exert good sound absorption performance over both of the high and low frequency components of the engine noises.

In the embodiment, the upper side layer portion 70a of the intermediate layer 70 is constructed by the upper side film portion 71a of the front side film 71, the upper side film portion 72a of the barrier film 72 and the upper side film portion 73a of the rear side film 73.

Furthermore, the lower side layer portion 70b of the intermediate layer 70 is constructed by the lower side film portion 71b of the front side film 71, the lower side film portion 72b of the barrier film 72 and the lower side film portion 73b of the rear side film 73.

In addition, the boundary portion between the upper side layer portion 70a and lower side layer portion 70b of the intermediate layer 70 corresponds to the boundary portion between the upper side layer portion 60a and lower side layer portion 60b of the front side layer 60.

The rear side layer 80 includes, as illustrated in FIG. 2, an upper side layer portion 80a and a lower side layer portion 80b. The upper side layer portion 80a and the lower side layer portion 80b are fusion-bonded at their front surfaces on the rear surface of the intermediate layer 70 (a rear surface of the rear side film 73).

The front surface of the upper side layer portion 80a is fusion-bonded at its front surface on a rear surface of a film portion of the upper side layer portion 70a (the upper side film portion 73a of the rear side film 73). In addition, the above-mentioned film portion of the upper side layer portion 70a is a film portion excluding a boundary near portion P with the lower side layer portion 70b of the upper side layer portion 70a therefrom.

The upper side layer portion 80a acts as a sound absorbing layer portion which absorbs mainly the high frequency noise components of the engine noises, similarly to the front side layer 60. In the embodiment, the upper side layer portion 80a is formed from a porous material with a predetermined thickness (for example, 5 (mm) and a predetermined basis weight (for example, 800 (g/m$^2$)).

In the first embodiment, as a porous material for forming the upper side layer portion 80a, adopted is a material such as a felt (hereinafter, referred to as a felt for rear side sound absorption) which is formed from polyethylene terephthalate.

And, the porous material for forming the upper side layer portion 80a, the predetermined thickness thereof and the predetermined basis weight thereof are predetermined so as to be capable of mainly securing good sound absorption performance to the high frequency components among noises (hereinafter, referred to as engine noises) from the engine E.

This means that the upper side layer portion 80a is formed from a forming material having a volume density lower than that of the material for forming the lower side layer portion 80b, thereby to secure mainly good sound absorption performance to the high frequency components of the engine noises.

And, the front surface of the lower side layer portion 80b is fusion-bonded at its front surface on the rear surfaces of a lower end portion 81 of the upper side layer portion 80a, the near-boundary portion P of the upper side layer portion 70a and the lower side layer portion 70b.

More specifically, an upper end portion 82 of the lower side layer portion 80b is fusion-bonded at its front surface on the rear surface of the lower end portion 81 of the upper side layer portion 80a.

Furthermore, an intermediate-side extended portion 83 which is extended from the upper end portion 82 downward in the lower side layer portion 80b is fusion-bonded at its surface on the rear surface of the boundary near portion P of the upper side layer portion 70a. And, a lower side extended portion 84 which is extended from the intermediate-side extended portion 83 downwards in the lower side layer portion 80b is fusion-bonded at its front surface on the rear surface of the lower side layer portion 70b.

In addition, a triangular cross sectional empty portion is, as shown in FIG. 2, formed by a lower end surface of the upper side layer portion 80a, a rear surface of the boundary near portion P of the upper side layer portion 70a and a front surface of the intermediate-side extended portion 83 of the lower side layer portion 80b. The empty portion is formed due to the thickness of the upper side layer portion 80a and the thickness of the lower side layer portion 80b. This is caused by each thickness of the upper side layer portion 80a and the lower side layer portion 80b.

The lower side layer portion 80b acts as a sound insulation layer portion which mainly insulates the low frequency noise components of the engine sound. Accordingly, the lower side layer portion 80b is formed from a sound insulation material with a predetermined thickness and a predetermined basis weight.

In the first embodiment, as a sound insulation material for forming the lower side layer portion 80b, is adopted a material which has a heavy weight such as a rubber (hereinafter, referred to as a rubber for rear side sound insulation). And, the sound insulation material which forms the lower side layer portion 80b is predetermined together with the predetermined thickness and basis weight thereof so as to be capable of mainly securing good sound insulation performance to the low frequency components of the engine noises. This means that the lower side layer portion 80b is formed from a forming material of a volume density higher than that of the material forming the upper side layer portion 80a, thereby to secure good sound insulation performance to the low frequency components of the engine noises.

Next, the dash silencer DS constructed as described above is manufactured as follows. First, at the preparatory process S1 of FIG. 3, the above-described felt for the front side layer is cut so as to have an outline dimension according to an outline dimension of the dashboard 30. Then, the cut felt is prepared as a felt for the front side layer having a thickness of 8(mm).

And, a felt for the above-described rear side sound absorption and a rubber for rear side sound insulation are cut so as to have outline dimensions according to each outline dimensions of the upper side layer portion 80a and outer dimension of the lower side layer portion 80b, thereby to be prepared as a felt for rear side sound absorption and a rubber for rear side sound insulation.

Furthermore, as raw materials for the front side film 71, the barrier film 72 and the rear side film 73 of the intermediate layer, a polyethylene film for the front side film 71, a nylon film for the barrier film 72 and a polyethylene film for the rear side film 73 are prepared.

Next, at a heating process S2, the polyethylene film for the front side film 71, the nylon film for the barrier film 72 and the polyethylene film for the rear side film 73 which are prepared as described above are laminated in this order and heated. In addition, the heating temperature is determined to be lower than a melting point of nylon and to be higher than a melting point of polyethylene.

Therefore, only the polyethylene film for the front side film 71 and the polyethylene film for the rear side film 73 among the polyethylene film for the front side film 71, the nylon film for the barrier film 72 and the polyethylene film for the rear side film 73 are in a melted state, and the nylon film for the barrier film 72 is not melted.

Figure 5:
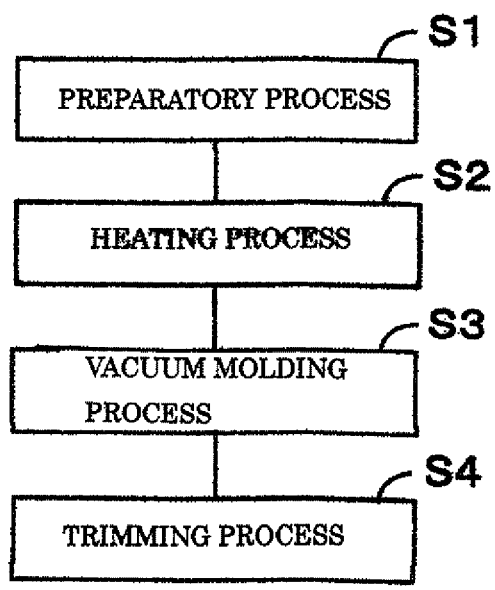
FIG. 5 is a diagram illustrating a sequence of manufacturing processes of the dash silencer according to the first embodiment.

Next, at a vacuum molding process S3 of FIG. 5, the melted polyethylene film for the front side film 71, the nylon film for the barrier film 72 and the melted polyethylene film for the rear side film 73 are laminated on the felt for the front side layer, which is prepared above, from the side of the melted polyethylene film for the front side film 71, and the felt for the rear side sound absorption and the melted polyethylene film for the rear side film 73 are arranged on the upper and lower portions, and are laminated on the melted polyethylene film for the rear side film 73. Herein, the rubber for the rear side sound insulation is superposed at its upper end portion to a lower end portion of a lower end portion of the felt for the rear side sound absorption from the outside, and is laminated on the melted polyethylene film for the rear side film 73.

The felt for the front side layer, the melted polyethylene film for the front side film 71, the nylon film for the barrier film 72, the melted polyethylene film for the rear side film 73, the film for the rear side sound absorption and the rubber for the rear side sound insulation which are laminated in the above manner are interposed between both dies or molds, and then pressed and cooled integrally under vacuum molding to be adhered or fixed to each other.

This means that the felt for the front side layer, the polyethylene film for the front side film 71, the nylon film for the barrier film 72, the polyethylene film for the rear side film 73, the felt for the rear side sound absorption and the rubber for the rear side sound insulation are formed as a dash silencer by one-shot molding.

And then, at the next trimming process S4, a trimming processing is performed on the dash silencer formed as described above. Accordingly, the felt for the front side layer becomes the front side layer 60, the polyethylene film for the front side film 71, the nylon film for the barrier film 72 and the polyethylene film for the rear side film 73 become the intermediate layer 70 as a film lamination body, and the felt for the rear side sound absorption and the rubber for the rear side sound insulation become the rear side layer 80 which constructs the upper side layer portion 80a and the lower side layer portion 80b. Thus, the above-described dash silencer DS is manufactured.

In the first embodiment as described above, when the engine E produces engine noises, the engine noises are incident on the front side layer 60 through the dash panel 30.

Herein, the front side layer 60 is formed from the above-described felt. Thus, the front side layer 60 can exert good sound absorption performance to the high frequency noise components of the engine noises on a basis of good air permeable performance thereof.

Therefore, the high frequency noise components of the engine noises which are incident on the front side layer 60, as described above is mainly absorbed by the front side layer 60.

Accordingly, the remaining high frequency noise components of the engine noises incident on the front side layer 60, as described above are incident through the front side layer 60 on the intermediate layer 70 with the lower frequency noise components of the engine noises incident on the front side layer 60.

Herein, the intermediate layer 70 is constructed as a three-layered film lamination body which has non-air permeability and includes the front side film 71, the barrier film 72 and the rear side film 73, as described above. Thus, the intermediate layer 70 exerts resonance phenomena with respect to the engine noises under its three-layered film construction, thereby to be capable of exerting good sound absorption performance over a wide frequency range of the engine noises.

Accordingly, the remaining high frequency noise components and the low frequency noise components among the engine noises incident on the intermediate layer 70, as described above are effectively absorbed by the intermediate layer 70. Subsequently, the remaining high and low frequency noise components among the high and lower frequency noise components incident on the intermediate layer 70, as described above are incident through the intermediate layer 70 on the rear side layer 80.

Herein, the upper side layer portion 80a of the rear side layer 80 is formed from a felt. Thus, the upper side layer portion 80a can exert good sound absorption performance to the high frequency noise components of the engine noises on a basis of good air-permeability thereof.

Furthermore, the lower side layer portion 80b of the rear side layer 80 is formed from the sound insulation material. This means that the lower side layer portion 80b has a high density. Accordingly, the lower side layer portion 80b can exert good sound insulation performance insulating mainly the low frequency components of the engine noises.

Thus, the high frequency noise components among the high frequency noise components and the remaining low frequency noise components which are incident on the rear side layer 80, as described above are absorbed mainly by the upper side layer portion 80a, and the low frequency noise components is insulated mainly by the lower side layer portion 80b.

As described above, according to the dash silencer DS, the engine noises are effectively absorbed and insulated. Thus, the engine sounds can be effectively soundproofed from the inner portion of the vehicle compartment 20.

Herein, frequency components which are incident through the upper side layer portion 80a on the instrument panel 50 among the engine sounds are reflected by the instrument panel 50 and are incident on the upper side layer portion 80a again. Accordingly, the above-mentioned frequency components are absorbed by the upper side layer portion 80a.

Thus, even if the engine noises are reflected between the upper side layer portion 80a and the instrument panel 50, it can be effectively prevented that the engine noises are confined in an inner side of the instrument panel 50 and are transmitted as confined noises to the inner portion of the vehicle compartment 20 from a portion between the instrument panel 50 and the rear side layer 80.

Furthermore, at the manufacturing process of the dash silencer DS as described above, polyethylene films of the front side film 71 and rear side film 73 which construct the intermediate layer 70 are melted and thereafter are fusion-bonded through the barrier film 72.

Thus, the film lamination body of the intermediate layer 70 is effectively formed without peeling or the like among the front side film 71, the barrier film 72 and the rear side film 73.

And, the intermediate layer 70 formed in this manner is pressed and cooled under the vacuum molding in a state where it is layered between the front side layer 60 and the rear side layer 80, thereby to form the dash silencer DS In other words, the dash silencer DS is manufactured by simultaneously molding the front side layer 60, the intermediate layer 70 and the rear side layer 80, which are layered mutually, with vacuum molding.

This means that the dash silencer DS can be manufactured by one-shot molding at the vacuum molding process. As a result, the manufacturing processes of the dash silencer DS can be simplified.

Furthermore, the lower side layer portion 80b among the upper side layer portion 80a and lower side layer portion 80b which construct the rear side layer 80 is superposed at its upper end portion 82 to the lower end portion 81 of the upper side layer portion 80a from the rear surface side thereof, as described above. Thus, the above-described one-shot molding can be still better performed.

In addition, the dash silencer DS is constructed by the front side layer 60, intermediate layer 70 and rear side layer 80 which are formed, as described above. Thus, the dash silencer DS still has a light weight.

Figure 6:
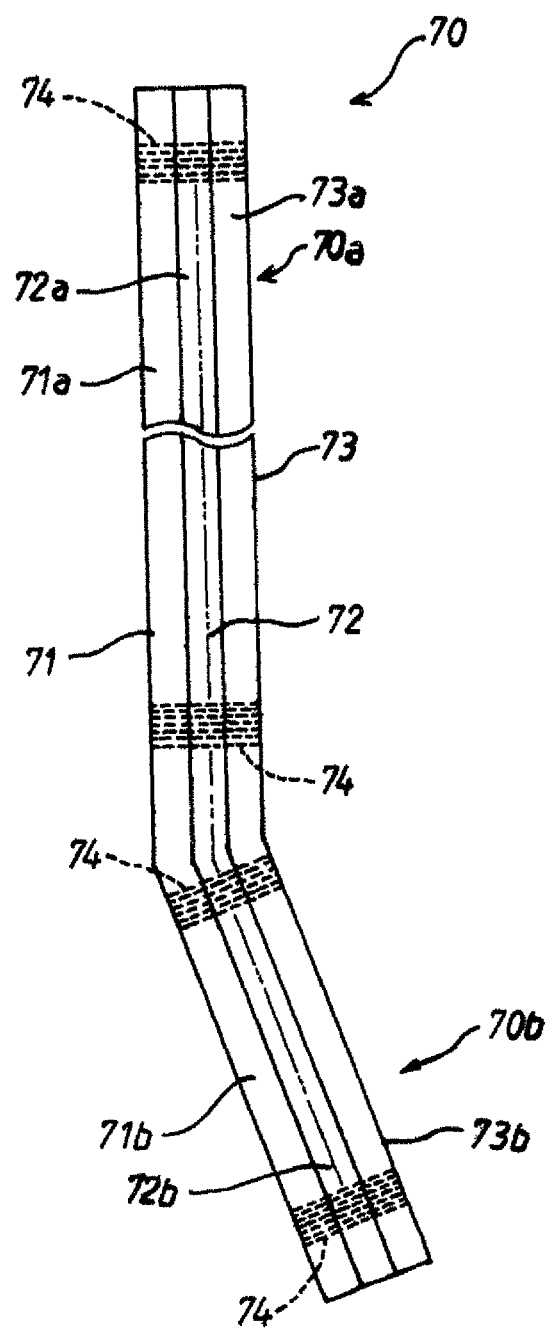
FIG. 6 is an enlarged partial fragmented side diagram illustrating main components of a second embodiment of the present invention.

FIG. 6 illustrates a main construction of a second embodiment of the present invention. In the second embodiment, a plurality of small holes 74 are formed in the intermediate layer 70 which is described in the above-mentioned first embodiment.

A plurality of the small holes 74 are formed penetratingly from the front surface of the front side film 71 to the rear surface of the rear side film 73 in the intermediate layer 70 described in the first embodiment.

Herein, A plurality of the small holes 74 are penetratingly formed over the entire surface of the intermediate layer 70 with a predetermined diameter (for example, 5 (mm)) and a predetermined opening pitch (for example, 30 (mm)). This means that a plurality of the small holes are penetratingly formed with a predetermined uniform opening ratio of 2(%) in the intermediate layer 70. In addition, the opening pitch indicates a distance between the centers of two adjacent small holes. The other constructions are the same as those of the first embodiment.

Furthermore, for manufacturing the intermediate layer 70 of the dash silencer DS in the second embodiment, the polyethylene film for the front side film 71, nylon film for the barrier film 72 and polyethylene film for the rear side film 73 which are prepared in the preparatory process S1 in the heating process S2 of FIG. 5 are layered in this order as a film lamination body, and thereafter a plurality of the small holes are formed in the film lamination body by a hole opening apparatus (not illustrated) as follows.

Herein, the hole opening apparatus has a hole opening roller which is rotatably supported. In the hole opening roller, a plurality of needle-shaped protrusions are protruded so as to be extended from an outer surface of the hole opening roller with a pitch which corresponds to a predetermined opening pitch (30(mm)) of each of the small holes of the above-described intermediate layer 70.

In addition, an outer diameter of the base portion of each needle-shaped protrusion is equal to a diameter (5(mm)) of each of the small holes of the above-described intermediate layer 70.

With the hole opening apparatus as constructed above, the above-described film lamination body is pressed on an outer surface of the hole opening roller so as to be pierced with a plurality of the needle-shaped protrusions, and thereafter the hole opening roller is rotated. Thus, a plurality of the small holes are formed to the above-described film lamination body (hereinafter, referred to as a hole-opened film lamination body) with a uniform opening ratio of 2(%).

And then, at the heating process S2, the hole-opened film lamination body is heated as the same as described in the first embodiment. Additionally, even if a plurality of the small holes are formed in the hole-opened film lamination body as described above, a plurality of the small holes are not clogged because the hole-opened film lamination body is very thin. The other manufacturing processes are the same as those of the first embodiment.

In the second embodiment constructed as described above, when engine noises are incident on the intermediate layer 70 similarly to the first embodiment, the engine noises pass through a plurality of the small holes 74 on the basis of the thinness of the intermediate layer 70, thereby to be capable of being effectively absorbed.

Herein, a plurality of the small holes 74 are uniformly formed over the entire surface of the intermediate layer 70 on a basis of the above-described uniform opening ratio of 2(%).

Accordingly, the above-described engine noises pass through all the small holes 74, thereby to be capable of being absorbed. This means that the engine noises are absorbed by the intermediate layer 70 over the entire surface thereof.

Therefore, the engine noises which are incident from the intermediate layer 70 on the rear side layer 80 can be further reduced, and the engine noises which are incident on the rear side layer 80 can be more effectively soundproofed on a basis of the sound absorption performance of the upper side layer portion 80*a* of the rear side layer 80 and the sound insulation performance of the lower side layer portion 80*b* of the rear side layer 80. The other operations and effects are the same as those of the first embodiment.

Figure 7:
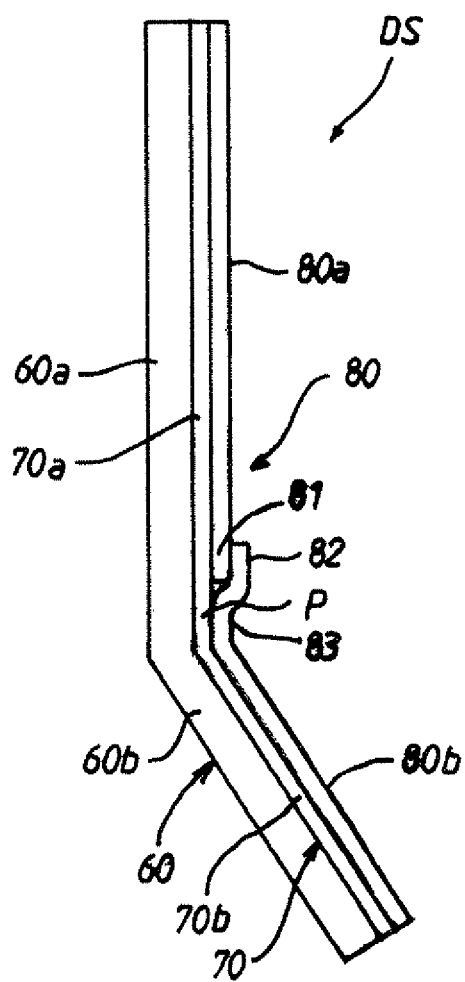
FIG. 7 is an enlarged side diagram illustrating a dash silencer according to a third embodiment of the present invention.

FIG. 7 illustrates main construction of a third embodiment according to the present invention. In the third embodiment, the intermediate layer 70 is formed with only the upper side layer portion 70*a*, differing from the first embodiment.

Accordingly, the rear side layer 80 is directly layered on the lower side layer portion 60*b* of the front side layer 60 at the lower side layer portion 80*b*.

Herein, the lower side layer portion 80*b* is fusion-bonded on each rear surface of the lower end portion 81 of the upper side layer portion 80*a* and the boundary near portion P of the upper side layer portion 70*a*, and is adhered on the rear surface of the lower side layer portion 60*b* of the front side layer 60. In the third embodiment, the upper side layer portion 70*a* is also referred to as the intermediate layer 70*a*. The other constructions are the same as those of the first embodiment.

In the third embodiment constructed as described above, the lower side layer portion 80*b* is fusion-bonded on each rear surface of the lower end portion 81 of the upper side layer portion 80*a* and the boundary near portion P of the upper side layer portion 70*a* and is adhered on the rear surface of the lower side layer portion 60*b* of the front side layer 60.

With such construction of the third embodiment as described above, even if the engine noises are incident on the front side layer 60, the engine noises are absorbed by the front side layer 60 as the same as the first embodiment due to a porous material forming the front side layer 60, and thereafter are incident on the intermediate layer 70*a* and the lower side layer portion 80*b* of the rear side layer 80.

Herein, the film lamination body which is a sound absorbing layer is constructed by three layered films as described above. Accordingly, the engine noises which are incident on the intermediate layer 70*a* are effectively absorbed by the film lamination body, and thereafter are incident on the upper side layer portion 80*a* of the rear side layer 80.

Furthermore, the rear side layer 80 is constructed by the upper side layer portion 80*a* and the lower side layer portion 80*b*, as described above. Herein, the upper side layer portion 80*a* is formed from a porous material, and the lower side layer portion 80*b* is formed from a sound insulation material.

Accordingly, the engine noises which are incident on and pass through the intermediate layer 70*a* are absorbed by the upper side layer portion 80*a* of the rear side layer 80, and the noises which are incident on the lower side layer portion 80*b* of the rear side layer 80 are insulated by the lower side layer portion 80*b*.

Thus, in the third embodiment, even if the intermediate layer 70 described above in the first embodiment is formed by only the upper side layer portion 70*a*, the engine noises can be effectively soundproofed by the soundproof sheet substantially the same as the first embodiment. The other operations and effects are the same as those of the first embodiment.

Furthermore, the constructions of the third embodiment and the operations and effects of the third embodiment can be attained in the second embodiment.

In addition, the present invention is not limited to the above embodiments, but various modified examples can be made as follows.

(1) In the intermediate layer 70, a material for forming the barrier film 72 is not limited to nylon, but a resin such as a polyester film or the like may be used. And, materials for forming the front side film 71 and the rear side film 73 may be a thermoplastic resin with a melting point (200(° C.) or less) which is lower than that of the material for forming the barrier film 72.

The above-mentioned thermoplastic resin with a melting point (200(° C.) or less) is, for example, polyethylene, polypropylene, polyethylene terephthalate or unsaturated polyester.

(2) The material forming the front side layer 60 or the upper side layer portion 80*a* of the rear side layer 80 is not limited to the materials described in the embodiments. The material forming the front side layer 60 or the upper side layer portion 80a may be a structure material of an organic fiber such as PET or wool or an inorganic fiber such as a glass wool or a porous material such as a porous synthetic resin material such as a urethane foam.

(3) In the intermediate layer 70, the materials for forming the front side film 71 and the formation material of the rear side film 73 may have a melting point lower than that of the formation material of the barrier film 72 respectively, and may be different thermoplastic resin materials with each other.

(4) For manufacturing the above-described dash silencer DS, a sheet-like polyethylene for the front side film, a sheet-like nylon for the barrier film and a sheet-like polyethylene for the rear side film may be previously prepared. In this case, all the sheet-like polyethylene, sheet-like nylon and sheet-like polyethylene may be layered and then inserted, thereby to be formed as the above-mentioned single sheet-like film, differing from the embodiments.

(5) Noises to the dash silencer DS are not limited to the engine sounds, but it may include various noises entering the engine room.

(6) For embodying the present invention, the present invention is not limited to the dash silencer, and may be applied to a floor silencer, a pillar silencer, a roof silencer, a room partition silencer, a hood silencer, an engine undercover silencer, and the like.

(7) For embodying the present invention, in the rear side layer 80 of the dash silencer DS described in the above embodiment, up and down directional widths of the superposed portions of the upper side layer portion 80a and the lower side layer portion 80b may be appropriately changed if necessary. For example, the upper side layer portion 80a may be formed so as to be superposed with the entire region of the lower side layer portion 80b.

(8) For embodying the present invention, the dash silencer DS may be layered on at least a predetermined region of the dashboard 30 (for example, a central region of the dashboard 30), differing from the above embodiments.

What is claimed is:

1. A soundproof sheet for a vehicle, comprising:
a first outer layer formed from a porous material, said first outer layer including a one-side outer layer portion and also including the other-side outer layer portion being extended from the one-side outer layer portion;
an intermediate layer formed by a film lamination body, said intermediate layer being layered on the one-side outer layer portion of said first outer layer; and
a second outer layer including a one-side outer layer portion formed from a porous material to be layered on said intermediate layer from the opposite side of the one-side outer layer portion of said first outer layer, said second outer layer also including the other-side outer layer portion formed from a sound insulation material to be layered on the other-side outer layer portion of said first outer layer.

2. The soundproof sheet for a vehicle according to claim 1, wherein the one-side and other-side outer layer portions of said second outer layer are superposed; and layered at their mutual neighboring portions with each other on a portion of said intermediate layer corresponding to the mutual neighboring portions of the one-side and other-side outer layer portions of said second outer layer.

3. The soundproof sheet for a vehicle according to claim 2, wherein the film lamination body constructing said intermediate layer includes:

a barrier film formed from a resin having a melting point higher than that of a thermoplastic resin;
a first film formed from the thermoplastic resin, said first film being fusion-bonded and layered between said barrier film and one of said first and second outer layers at a temperature lower than the melting point; and
a second film formed from the thermoplastic resin, said second film being fusion-bonded and layered between said barrier film and the other of said first and second outer layers at a temperature lower than the melting point,
wherein the other-side outer layer portion of said second outer layer is superposed and layered at its neighboring portion on the neighboring portion of the one-side outer layer portion of said second outer layer and a portion of said intermediate, layer from the opposite side of the other-side outer layer portion of said first outer layer.

4. The soundproof sheet for a vehicle according to claim 3, wherein the film lamination body has a plurality of small holes formed dispersedly and penetratingly through the film lamination body toward each thickness direction of said first film, said barrier film and said second film.

5. A soundproof sheet for a vehicle comprising:
a first outer layer formed from a porous material, said first outer layer including a one-sided outer layer portion; and also including the other-side outer layer portion extended from the one-side outer layer portion;
an intermediate layer formed by a film lamination body and including a one-sided intermediate layer portion and the other-side intermediate layer portion extended from the one-side intermediate layer portion, said intermediate layer being layered at its one-side intermediate layer portion on the one-side outer layer portion of said first outer layer and being also layered at its other-side intermediate layer portion on the other-side outer layer portion of said first outer layer; and
a second outer layer including a one-side layer portion formed from a porous material and the other-side outer lamer portion formed from a sound insulation material, said second outer layer being layered at its one-side outer layer portion on the one-side intermediate layer portion of said intermediate layer from the opposite side of the one-side our layer portion of said first outer layer and being also layered at its other-side outer layer portion on at least the other-side intermediate layer portion of said intermediate layer from the opposite side of the other-side outer layer portion of said first outer layer.

6. The soundproof sheet for a vehicle according to claim 5, wherein the one-side and other-side outer layer portions of said second outer layer are superposed and layered at their mutual neighboring portions with each other on a portion of the one-side intermediate layer portion of said intermediate layer corresponding to the mutual neighboring portions of the one-side and other-side outer layer portions of said second outer layer.

7. The soundproof sheet for a vehicle according to claim 6, wherein the film lamination body constructing said intermediate layer includes:
a barrier film formed from a resin having a melting point higher than that of a thermoplastic resin;
a first film formed from the thermoplastic resin, said first film being fusion-bonded and layered between said barrier film and one of said first and second outer layers at a temperature lower than the melting point; and
a second film formed from the thermoplastic resin, said second film being fusion-bonded and layered, between said barrier film and the other of said first and second outer layers at a temperature lower than the melting point, and wherein the other-side outer layer portion of said second outer layer is layered at its neighboring portion thereof on the neighboring portion of the one-side outer layer portion of said second outer layer and a portion of the other-side intermediate layer portion of said intermediate layer from the opposite side of the other-side outer layer portion of said first outer layer.

8. The soundproof sheet for a vehicle according to claim 7, wherein the film lamination body has a plurality of small holes formed dispersedly and penetratingly through the film lamination body toward each thickness direction of said first film, said barrier film and said second film.

9. A manufacturing method of a soundproof sheet for a vehicle, comprising:

a preparatory process for preparing a porous material layer for a first outer layer, preparing a porous material layer for a one-side outer layer portion of a second outer layer and a sound insulation material layer for the other-side outer layer portion of said second outer layer, and preparing a-thermoplastic resin material films for each of a one-side film and the other-side film, and a resin material film for a barrier film having a melting point higher than that of the thermoplastic resin material film;

a heating process for layering the thermoplastic resin material film for the one-side film, the resin material film for said barrier film and the thermoplastic resin material film for the other-side film so as to construct a film lamination body, and heating and fusion-bonding them with each other as the film lamination body at a temperature which is higher than a melting point of the thermoplastic resin material film and lower than the melting point of the resin material film for said barrier film; and a vacuum molding process for layering on the fusion-bonded film lamination body on the porous material layer for said first outer layer from the fusion-bonded thermoplastic resin material film for the one-side film of the fusion-bonded film lamination body, layering the porous material layer for the one-side outer layer portion of said second outer layer and the sound insulation material layer for the other-side outer layer portion of said second outer layer on the fusion-bonded thermoplastic resin material film for the other-side film of the fusion-bonded film lamination body, and pressing and cooling them integrally under vacuum molding so as to be adhered to each other.

10. The manufacturing method of a soundproof sheet for a vehicle according to claim 9, wherein at said vacuum molding process, for layering the porous material layer for said first outer layer, the fusion-bonded film lamination body, the porous material and sound insulation material layers respectively for the one-side and other-side outer layer portions of said second outer layer, the one-side and other-side outer layer portions of said second outer layer are superposed and layered at their mutual neighboring portions with each other and layered on a portion of the thermoplastic resin material film for the other-side film corresponding to the mutual neighboring portions of the one-side and other-side outer layer portions of said second outer layer.

11. A dash silencer for a vehicle which is installed along a partitionary wall member partitioning an engine room and a vehicle compartment included in the vehicle with an instrument panel disposed oppositely to an upper side portion of the partitionary wall member from the inner side of the vehicle compartment, the dash silencer comprising:

a soundproof sheet which includes:

a first outer layer formed from a porous material, said first outer layer including a one-side outer layer portion and also including the other-side outer layer portion extended from the one-side outer layer portion, an intermediate layer formed by a film lamination body, said intermediate layer being layered on the one-side outer layer portion of said first outer layer, and a second outer layer including a one-side outer layer portion formed from a porous material to be layered on said intermediate layer from the opposite side of the one-side outer layer portion of said first outer layer, said second outer layer also including the other-side outer layer portion formed from a sound insulation material to be layered on the other side outer layer portion of said first outer layer wherein said soundproof sheet is mounted on at least a predetermined region of the partitionary wall member to layer the first outer layer along the predetermined region of the partitionary wall member from its up-side to its lower-side so as to oppose the one-side layer portion of the second outer layer to the instrument panel.

12. The dash silencer for a vehicle according to claim 11, wherein in said soundproof sheet, the one-side and other-side outer layer portions of said second outer layer are superposed and layered at their mutual neighboring portions with each other on a portion of said intermediate layer corresponding to the mutual neighboring portions of the one-side and the other-side layer portions of the second outer layer.

13. The dash silencer for a vehicle according to claim 12, wherein in said soundproof sheet, the film lamination body constructing said intermediate layer includes:

a barrier film formed from a resin having a melting point higher than that of a thermoplastic resin, a first film formed from the thermoplastic resin and fusion-bonded at a temperature lower than the melting point to be layered on said barrier film, and a second film formed from the thermoplastic resin and fusion-bonded at a temperature lower than the melting point to be layered on said barrier film so as to oppose said first film through said barrier film, wherein the one-side outer layer portion of said second outer layer is layered at the neighboring portion thereof on the neighboring portion of the other outer layer portion of said second outer layer so as to oppose the corresponding portion of said intermediate layer through the neighboring portion of the other outer layer portion of said second outer layer.

14. The dash silencer for a vehicle according to claim 13, wherein in said soundproof sheet, the film lamination body has a plurality of small holes which are formed dispersedly and penetratingly through the film lamination body toward each thickness direction of said first film, said barrier film and said second film.

15. The dash silencer for a vehicle according to claim 13, wherein in said soundproof sheet, the film lamination body constructing said intermediate layer includes:

a barrier film formed from a resin having a melting point higher than that of a thermoplastic resin, a first film formed from the thermoplastic resin and fusion-bonded at a temperature lower than the melting point to be layered on said barrier film, and a second film formed from the thermoplastic resin and fusion-bonded at a temperature lower than the melting point to be layered on said barrier film so as to oppose said first film through said barrier film, wherein the one-side outer layer portion of said second outer layer is layered at the neighboring portion thereof on the neighboring portion of the other outer layer portion of said second outer layer so as to oppose the corresponding portion of said intermediate layer through the neighboring portion of the other outer layer portion of said second outer layer.

16. The dash silencer for a vehicle according to claim 15, wherein in said soundproof sheet, the film lamination body has a plurality of small holes which are formed dispersedly and penetratingly through the film lamination body toward each thickness direction of said first film, said barrier film and said second film.

17. A dash silencer for a vehicle
which is installed along a partitionary wall member partitioning an engine room and a vehicle compartment included in the vehicle with an instrument panel disposed oppositely to an upper side portion of the partitionary wall member from the inner side of the vehicle compartment, the dash silencer comprising:
a soundproof sheet which includes:
a first outer layer formed from a porous material, said first outer layer including a one-side outer layer portion and also layer portion extended from the one-side outer layer portion,
an intermediate layer formed by a film lamination body and including a one-sided intermediate layer portion and the one-side intermediate layer portion, said intermediate layer being layered at its one-side intermediate layer portion on the one-side outer layer portion of said first outer layer and being also layered at its other-side intermediate layer portion on the other-side outer layer portion of said first outer layer; and
a second outer layer including a one-side layer portion formed from a porous material and the other-side outer layer portion formed from a sound insulation material, said second outer layer being layered at its one-side outer layer portion on the one-side intermediate layer portion of said intermediate layer from the opposite side of the one-side outer layer portion of said first outer layer and being also layered at its other-side outer layer portion on at least the other-side intermediate layer portion of said intermediate layer from the opposite side of the other-side outer layer portion of said first outer layer;
wherein said soundproof sheet is mounted on at least a predetermined region of the partitionary wall member to layer the first outer layer along the predetermined region of the partitionary wall member from its up-side to its lower-side so as to oppose the one-side layer portion of the second outer layer to the instrument panel.

18. The dash silencer for a vehicle according to claim 17, wherein in said soundproof sheet, the one-side and other-side outer layer portions of said second outer layer are superposed and layered at their mutual neighboring portions with each other on a portion of the one-side layer portion of said intermediate layer corresponding to the mutual neighboring portions of the one-side and the other-side outer layer portions of the second outer layer.

* * * * *